United States Patent
Oonishi et al.

(10) Patent No.: US 7,062,380 B2
(45) Date of Patent: Jun. 13, 2006

(54) NAVIGATION SYSTEM, AND PROGRAM AND STORAGE MEDIUM FOR USE IN THE SAME

(75) Inventors: Kenta Oonishi, Okazaki (JP); Takanori Kaji, Okazaki (JP); Noboru Ishibashi, Okazaki (JP); Kunihiro Yamada, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 133 days.

(21) Appl. No.: 10/743,101

(22) Filed: Dec. 23, 2003

(65) Prior Publication Data

US 2004/0158393 A1 Aug. 12, 2004

(30) Foreign Application Priority Data

Feb. 10, 2003 (JP) .............................. 2003-031881

(51) Int. Cl.
*G01C 21/34* (2006.01)

(52) U.S. Cl. ................. 701/210; 701/209; 340/995.19; 340/995.21

(58) Field of Classification Search ................ 701/200, 701/202, 209, 210; 340/995.1, 995.19, 995.21, 340/995.27

See application file for complete search history.

(56) References Cited

U.S. PATENT DOCUMENTS

| | | | | |
|---|---|---|---|---|
| 5,043,902 A * | 8/1991 | Yokoyama et al. | ......... | 701/211 |
| 5,612,882 A * | 3/1997 | LeFebvre et al. | ........... | 701/209 |
| 5,841,366 A * | 11/1998 | Yamamoto et al. | ......... | 340/901 |
| 6,134,501 A * | 10/2000 | Oumi | ......................... | 701/209 |
| 6,195,611 B1 * | 2/2001 | Sakamoto et al. | .......... | 701/209 |
| 6,230,083 B1 * | 5/2001 | Matsuda et al. | ............... | 701/1 |
| 6,256,579 B1 * | 7/2001 | Tanimoto | .................... | 701/201 |
| 6,363,319 B1 * | 3/2002 | Hsu | ......................... | 701/202 |
| 6,415,226 B1 * | 7/2002 | Kozak | ....................... | 701/210 |
| 6,510,384 B1 * | 1/2003 | Okano | ........................ | 701/209 |
| 6,662,101 B1 * | 12/2003 | Adachi | ...................... | 701/201 |
| 2002/0082772 A1 * | 6/2002 | Okano | ........................ | 701/209 |
| 2002/0103599 A1 * | 8/2002 | Sugiyama et al. | .......... | 701/211 |

FOREIGN PATENT DOCUMENTS

JP       A-8-278157       10/1996

* cited by examiner

*Primary Examiner*—Gary Chin
(74) *Attorney, Agent, or Firm*—Oliff & Berridge, PLC (57) ABSTRACT

A navigation system that searches for a route to a destination based on stored map data that provides navigation guidance to the destination along the route, including a controller that searches for a first route to the destination as a route to be recommended based on a calculation of a search cost, detects whether the first route includes a curve, changes the search cost for any detected curve, searches for a second route to the destination based on the search cost that has been changed and employs the second route as the route to be recommended instead of the first route.

17 Claims, 6 Drawing Sheets

ROAD NAVIGATION GUIDE DATA

| NUMBER OF ROADS (n) | |
|---|---|
| 1 | ROAD NUMBER |
| | LENGTH |
| | ROAD ATTRIBUTE DATA |
| | ADDRESS AND SIZE OF SHAPE DATA |
| | ADDRESS AND SIZE OF NAVIGATION GUIDE DATA |
| ⋮ | |
| n | |

Fig. 3A

SHAPE DATA

| NUMBER OF NODES (m) | |
|---|---|
| 1 | EAST LONGITUDE |
| | NORTH LATITUDE |
| ⋮ | |
| m | |

Fig. 3B

NAVIGATION GUIDE DATA

| INTERSECTION NAME |
|---|
| CAUTION DATA |
| ROAD NAME DATA |
| ADDRESS AND SIZE OF ROAD NAME VOICE DATA |
| ADDRESS AND SIZE OF DESTINATION DATA |

Fig. 3C

DESTINATION DATA

| NUMBER OF DESTINATIONS (k) | |
|---|---|
| 1 | DESTINATION ROAD NUMBER |
| | DESTINATION NAME |
| | ADDRESS AND SIZE OF DESTINATION NAME VOICE DATA |
| | NAVIGATION DESTINATION DATA |
| | NAVIGATION GUIDANCE DATA |
| ⋮ | |
| k | |

Fig. 3D

NAVIGATION DIRECTION DATA

-1 : INVALID
0 : UNNECESSARY
1 : GO STRAIGHT
2 : TURN TO THE RIGHT
3 : CURVE TO THE RIGHT
4 : MAKE A RIGHT U-TURN
5 : TURN TO THE LEFT
6 : CURVE TO THE LEFT
7 : MAKE A LEFT U-TURN

NAVIGATION SYSTEM, AND PROGRAM AND STORAGE MEDIUM FOR USE IN THE SAME

INCORPORATION BY REFERENCE

The disclosure of Japanese Patent Application No. 2003-031881 filed on Feb. 10, 2003 including the specification, drawings and abstract are incorporated herein by reference in its entirety.

BACKGROUND OF THE INVENTION

1. Field of Invention

The invention relates to a navigation system and a program and a storage medium for use in such a navigation system.

2. Description of Related Art

A navigation system searches for a route that gives the lowest sum of search costs assigned to respective road links along the route to the destination, and provides navigation guidance to a destination along the determined route. In some cases, an unsuitable route is selected, via such simple searching, because there are many types of vehicles that vary in length, width, height, and weight, and thus all types of vehicles cannot necessarily drive along the route selected. Japanese Unexamined Patent Application Publication No. 8-278157, incorporated herein by reference in its entirety, discloses a navigation system capable of acquiring vehicle information necessary in extracting roads on which a vehicle can drive, extracting roads on which the vehicle can drive based on the road information, and searching for a route to a destination using those extracted roads.

However, in the conventional navigation system, the search cost employed in searching for a route to a destination is determined mainly by the length of the road. As such, there is a possibility that a road can be selected that has a low search cost but that is unsuitable for driving. For example, a mountain road can be selected rather than a road that is much better in terms of drivability, such as a bypass or a newly surfaced road. It may be possible to avoid selecting roads unsuitable for driving when searching for a route, if data indicating such unsuitable roads is prepared. However, this method requires a greater amount of data stored in a storage means.

SUMMARY OF THE INVENTION

The invention thus provides a navigation system that is capable of detecting a road that is unsuitable for driving even though the road can be driven, searching for a route that does not include the detected unsuitable road, and recommending the route selected as a result of the searching.

The invention, according to an exemplary aspect of the invention, includes a navigation system that searches for a route to a destination based on stored map data that provides navigation guidance to the destination along the route, including a controller. The controller searches for a first route to the destination as a route to be recommended based on a calculation of a search cost, detects whether the first route includes a curve, changes the search cost for any detected curve, searches for a second route to the destination based on the search cost that has been changed and employs the second route as the route to be recommended instead of the first route.

The invention, according to another exemplary aspect, includes a navigation system that searches for a route to a destination based on stored map data that provides navigation guidance to the destination along the route, including a controller. The controller searches for a first route to the destination as a route to be recommended based on a calculation of a search cost, detects a road having a greater change in altitude than a predetermined value from the first route, changes the search cost for any detected road, searches for a second route to the destination based on the search cost that has been changed and employs the second route as the route to be recommended instead of the first route.

The invention, according to another exemplary aspect, includes a program for use in a navigation system that searches for a route to a destination based on stored map data that provides navigation guidance to the destination along the route, the program including a routine that searches for a first route to the destination as a route to be recommended based on a calculation of a search cost, a routine that detects whether the first route includes a curve, a routine that changes the search cost for any detected curve, a routine that searches for a second route to the destination based on the search cost that has been changed, and a routine that employs the second route as the route to be recommended instead of the first route.

The invention, according to another exemplary aspect, includes a program for use in a navigation system that searches for a route to a destination based on stored map data that provides navigation guidance to the destination along the route, the program including a routine that searches for a first route to the destination as a route to be recommended based on a calculation of a search cost, a routine that detects a road having a greater change in altitude than a predetermined value from the first route, a routine that changes the search cost for any detected road, a routine that searches for a second route to the destination based on the search cost that has been changed, and a routine that employs the second route as the route to be recommended instead of the first route.

The invention, according to another exemplary aspect, includes a storage medium for use in a navigation system that searches for a route to a destination based on stored map data that provides navigation guidance to the destination along the route, wherein the storage medium stores map data used in searching for the route and providing the navigation guidance along the route; and a program for use in the navigation system. The program including a routine that searches for a first route to the destination as a route to be recommended based on a calculation of a search cost, a routine that detects whether the first route includes a curve, a routine that changes the search cost for any detected curve, a routine that searches for a second route to the destination based on the search cost that has been changed and a routine that employs the second route as the route to be recommended instead of the first route.

The invention, according to another exemplary aspect, includes a storage medium for use in a navigation system that searches for a route to a destination based on stored map data that provides navigation guidance to the destination along the route, wherein the storage medium stores map data used in searching for the route and providing the navigation guidance along the route and a program for use in the navigation system. The program including a routine that searches for a first route to the destination as a route to be recommended based on a calculation of a search cost, a routine that detects a road having a greater change in altitude than a predetermined value from the first route, a routine that changes the search cost for any detected road, a routine that searches for a second route to the destination based on the search cost that has been changed, and a routine that employs the second route as the route to be recommended instead of the first route.

For the purposes of this disclosure, device and means may be considered synonyms. Further, in some cases, as defined in the specification, the device/means may include other elements.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
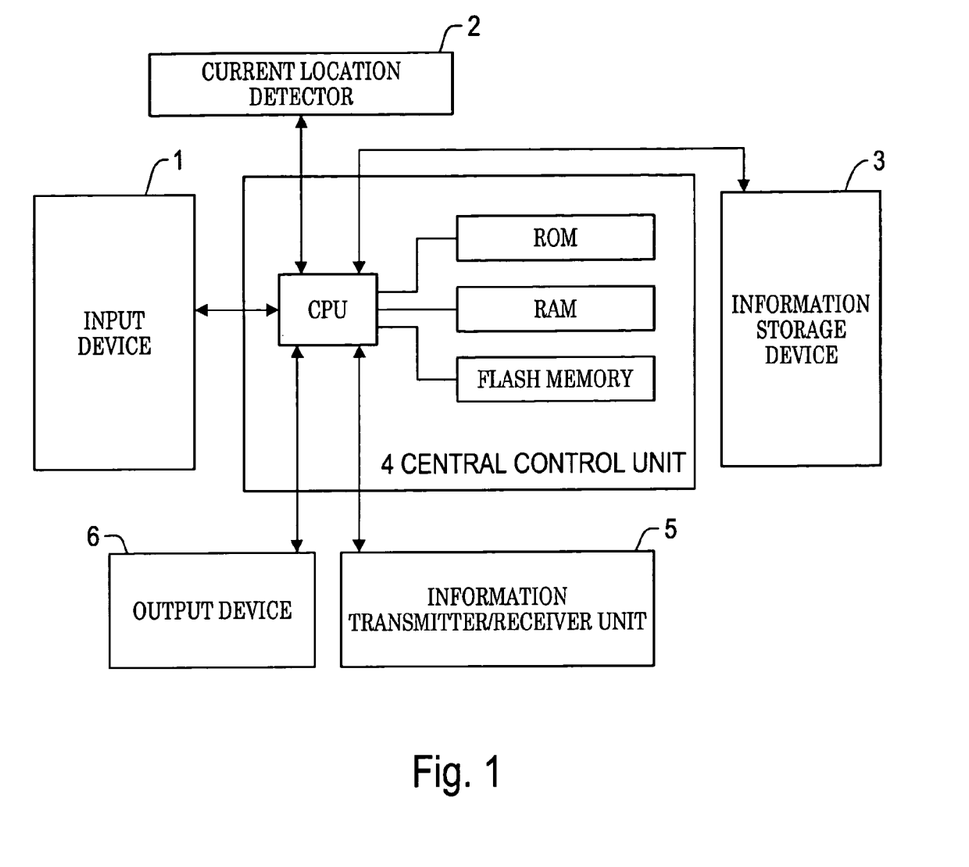
FIG. 1 is a diagram showing a navigation system according to an embodiment of the invention.

Embodiments of the invention are described below with reference to the accompanying drawings. FIG. 1 is a diagram showing a navigation system according to an embodiment of the invention. As shown in FIG. 1, the navigation system includes an input device 1 for inputting information associated with navigation guidance; a current location detector 2 for detecting information associated with the current location of a vehicle; an information storage device 3 for storing navigation data necessary in calculating a route, navigation guidance data necessary in providing navigation guidance, and a navigation program; a central control unit 4 for searching for a route, displaying the determined route, providing navigation guidance along the route, and controlling other operations of the entire system; an information transmitter/receiver unit 5 for communicating with an information center that stores data necessary for navigation and provides data in response to a request from a driver or for communicating with an information source such as an electronic notepad in which data such as map data or destination data specific to the driver is stored; and an output device 6 for outputting information associated with the navigation guidance. The construction of each part is described below.

The input device 1 is used by a driver to input, into the central control unit 4, a destination and a command to perform a navigation process in which navigation guidance information is provided by means of a voice/sound or an image displayed on a screen when the driver needs the navigation guidance information. To achieve the above capability, the input device includes a touch switch or an operation switch for inputting a telephone number or coordinates of a destination on a map thereby specifying the destination or for inputting a navigation request command.

A remote control unit or the like may also be used as the input device. The input device may additionally include a speech recognition unit for inputting a voice data/command and/or may further include a card reader for reading data stored in an IC card or a magnetic card.

The information transmitter/receiver unit 5 includes a receiver serving as traffic information acquisition means for receiving information transmitted from a VICS (Vehicle Information and Communication System) or a data transmitter/receiver unit. The VICS is a system for transmitting road traffic information in real time to vehicles by means of FM multiplex broadcasting (teletext), a radio beacon, or a light beacon. FM multiplex broadcast is used to transmit general information over a wide area. On the other hand, the radio beacon or the light beacon is used to transmit detailed information associated with a small area with a radius less than about 10 km from the beacon center, wherein vehicles can receive the information when the vehicles pass the beacon. VICS data includes data indicating, for each road assigned a particular link number, the degree of congestion (for example, impassable, jammed, very crowded, crowded, not crowded), a congestion start point, a congestion length, a traffic restriction (for example, closed or in construction), and a travel time (needed to pass a congested zone at a particular speed). As for the data transmitter/receiver unit, for example, a portable telephone or a personal computer may be used to transmit/receive information necessary for navigation to/from a traffic information center (such as an ATIS) in response to a request issued by the driver.

The output device 6 has a capability of outputting guidance information in the form of a voice/sound or a screen image when a driver needs such guidance information, and also has a capability of printing data processed by the central control unit 4. To realize the above capabilities, the output device 6 includes a display for displaying input data on the screen thereof or automatically displaying navigation guidance information on the screen in response to a request from the driver, a printer for printing data processed by the central control unit 4 or data stored in the information storage device 3, and a speaker for outputting navigation guidance information in the form of a voice.

As for the display, a color CRT or a color liquid crystal display may be used. The display is used to display various kinds of screens needed in navigation, such as a route setting screen based on map data or navigation guidance data processed by the central control unit 4, a road section diagram screen, or an intersection diagram screen. Buttons used to make settings associated with the navigation guidance or buttons to switch the navigation guidance or the screen are displayed on a corresponding screen. In particular, intersection information, such as a name of an intersection that is to be passed, is displayed in a color pop-up window on the road section diagram screen when the intersection information is necessary. The display is disposed, for example, on an instrument panel at a location close to a driver seat so that the driver can get information indicating the current location of the vehicle and information associated with a route from the road section diagram displayed on the display.

The current location detector 2 is a device for detecting information associated with the current location of the vehicle. For example, the current location detector 2 is formed of an absolute direction sensor such as a terrestrial sensor, a steering sensor, a relative direction sensor using a gyroscope or the like, a distance sensor for detecting a travel distance based on the number of wheel revolutions, or a GPS receiver for receiving GPS (Global Positioning System) information.

The information storage device 3 is an external storage device for storing a navigation program and associated data. A specific example of the information storage device 3 is a storage medium such as a CD-ROM. The programs stored in the information storage device 3 include an operation system and an application program for outputting a navigation signal, wherein the application program includes a map drawing module, a route searching module, a route guiding module, a current location calculation module, a destination setting module, and an operation control module. That is, in the information storage device 3, a program for searching for a route, a program for controlling the display of navigation guidance information, a program for controlling the output of voice information, necessary data that is used in those programs, display information data necessary for use in displaying a map or navigation guidance information are stored. The associated data includes map data necessary in the navigation guidance (for example, road map data, house map data, or building structure map data), intersection data, node data, road data, photograph data, registered point data, target point data, navigation guidance data, shape data, guide data, destination data, navigation direction data, detailed destination data, destination pronunciation data, telephone number data, address data, landmark data, and any other data used by the navigation system, wherein those data are stored in the form of files.

The central control unit 4 includes a CPU for performing various kinds of processing, a rewritable ROM (rewritable nonvolatile storage means) such as a flash memory (for example, an EEPROM (Electrically Erasable and Programmable ROM)) for storing important information (such as a route search program, a navigation guidance program, condition setting data, and data indicating various parameters) in a nonvolatile fashion, a ROM serving as nonvolatile storage means in which a program (program loading means) for checking and updating the programs stored in the flash memory, and a RAM (such as an SRAM (Static RAM) capable of electrically storing information) serving as a volatile read/write storage means for temporarily storing point information associated with registered points specified by the driver, frequency information updated via learning, or error correction information associated with various kinds of detection means. The central control unit 4 also includes an image memory for storing image data to be displayed on the display, an image processor for reading image data from the image memory in accordance with a display output control signal supplied from the CPU, performing image processing on the image data, and outputting the resultant image data to the display. Furthermore, the central control unit 4 also includes an audio processor for producing synthesized voice/sound data from voice data, phrase data, sentence data, and/or sound data read from the information storage device 3, converting the synthesized voice/sound data into an analog signal, and supplying the resultant analog signal to a speaker, in accordance with a voice/sound output control signal supplied from the CPU.

The programs and data used in the navigation may be read from the outside via the information transmitter/receiver unit 5. When the programs and data used in the navigation are read from the outside via the information transmitter/receiver unit 5, a storage medium such as a DVD may be used instead of the CD-ROM as the information storage device 3 so that the programs and the data stored thereon can be updated to the latest versions. The information storage device may be omitted, and the programs and the data may be directly stored in the flash memory or the RAM in the central control unit 4.

Figure 2:
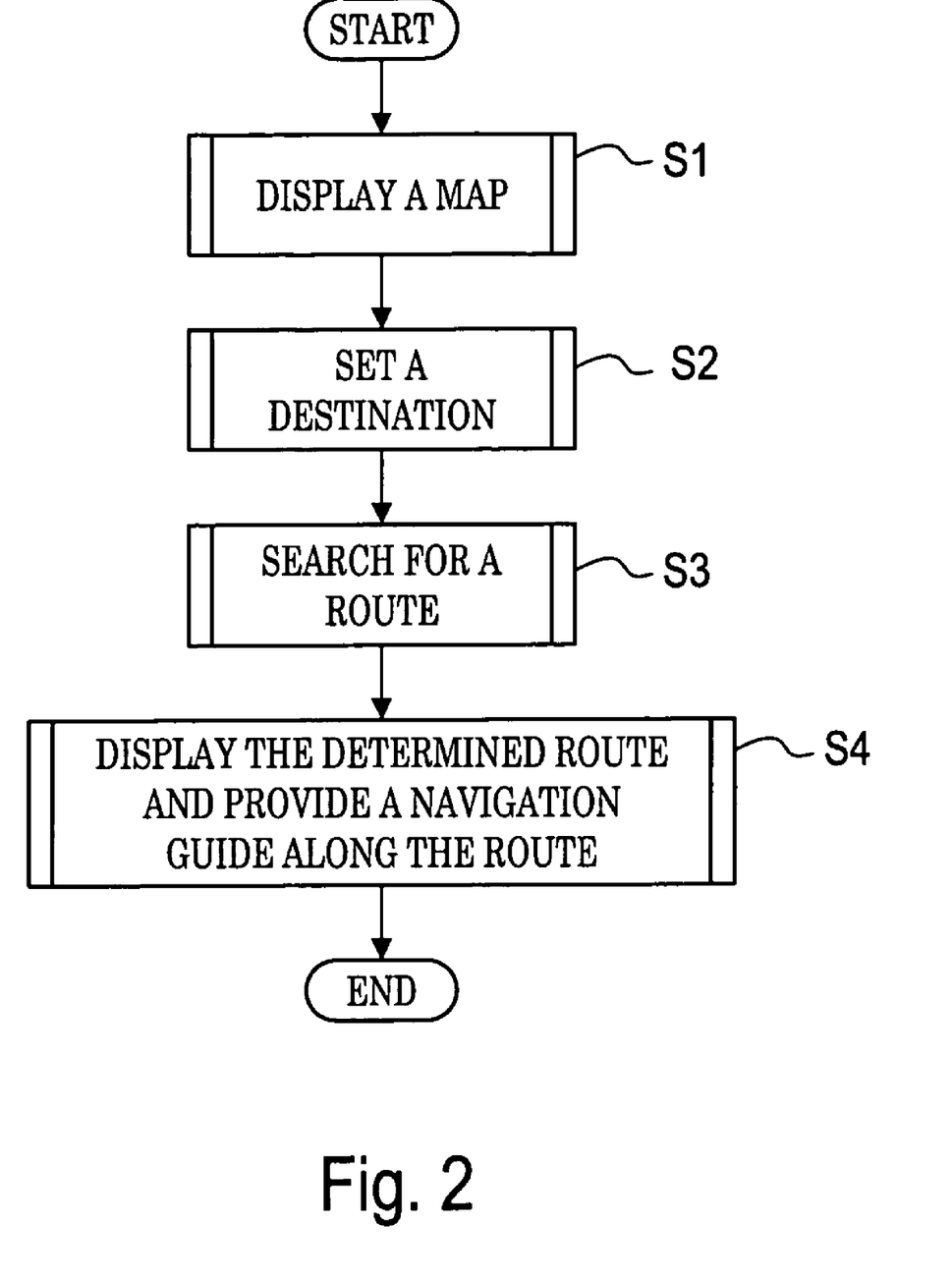
FIG. 2 is a diagram showing a general flow of processing performed by the navigation system according to the embodiment of the invention.

The operation of the navigation system is described below. FIG. 2 is a diagram showing a general flow of processing performed by the navigation system according to the present embodiment of the invention. In the navigation system constructed in the above-described manner, when the navigation guidance system program is started by the CPU of the central control unit 4, the current location is detected by the current location detector 2 and a map around the current location is displayed (step S1), as shown in FIG. 2. Thereafter, a destination is set based on a telephone number, an address, a facility name, or a registered point (step S2). A route from the current location to the destination is then searched (step S3). When the route is found, the route is displayed and navigation guidance is provided repeatedly while detecting the current location using the current location detector 2, until the destination is reached (step S4).

Figure 3A:
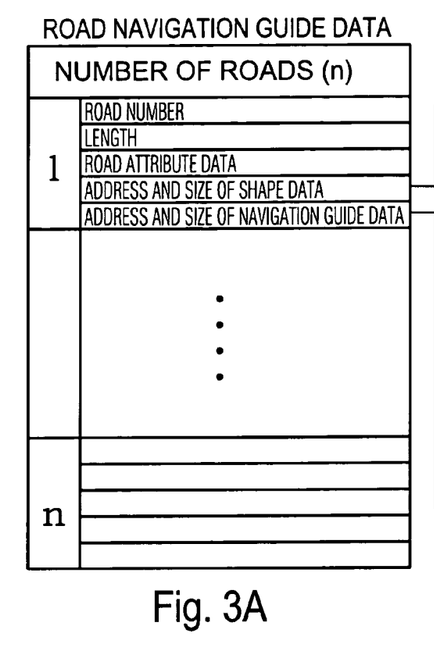
FIGS. 3A through 3E are diagrams showing an example of the data structure of road navigation guidance data.

FIGS. 3A through 3E are diagrams showing an example of a data structure of road navigation guidance data. As shown in FIG. 3A, a road navigation guidance data file includes the number, n, of roads included in the route determined via the searching process described above, and data indicating, for each of those roads, a road number, a length, a road attribute, the address and the size of shape data, and the address and the size of navigation guidance data, which are stored as data necessary in providing navigation guidance along the route determined via the searching process.

Figure 3B:
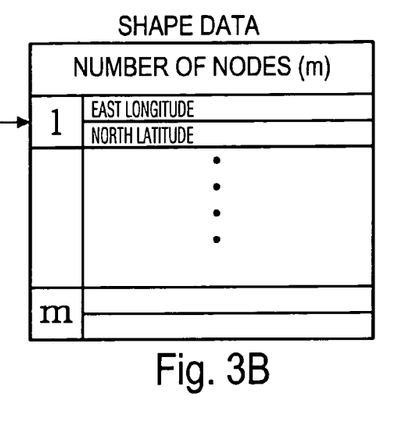
Figure 3C:
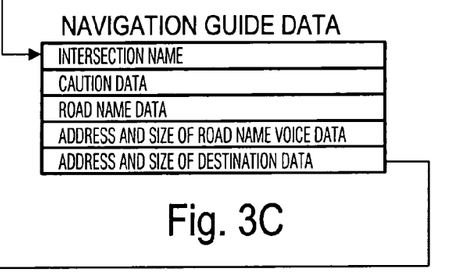

As shown in FIG. 3B, the shape data includes data indicating the number, m, of nodes at which each road is segmented, and also includes coordinate data indicating the coordinates of respective nodes as longitude and latitude. As shown in FIG. 3C, the navigation guidance data includes data indicating intersection (or branch point) name, caution data, road name data, the address and the size of road name voice data, and the address and the size of destination data.

Figure 3D:
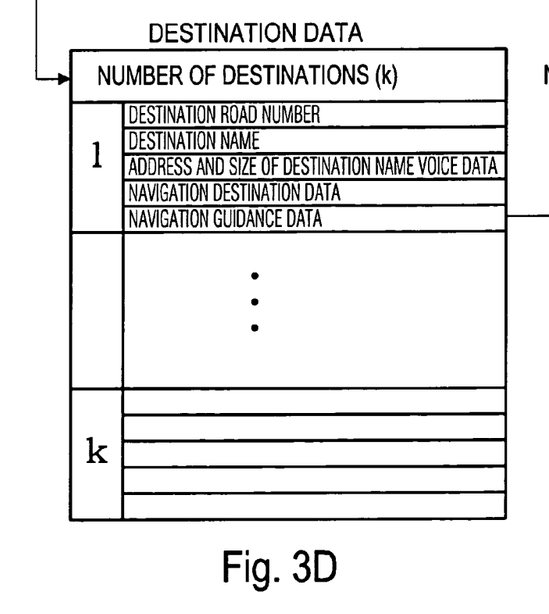
Figure 3E:
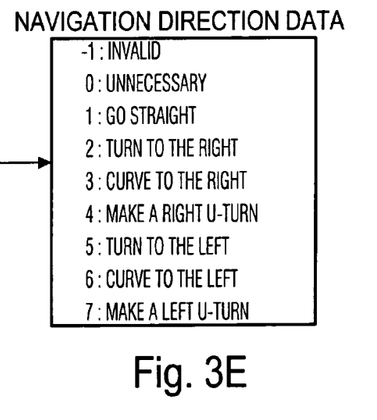

As shown in FIG. 3D, the destination data includes data indicating a destination road number, destination name data, the address and the size of destination name voice data, navigation destination data, and navigation guidance data. The navigation direction data included in the destination data indicates a navigation direction as shown in FIG. 3E, wherein the navigation direction data may be invalid (navigation direction data is not used), or unnecessary (navigation guidance is not provided), but otherwise it indicates whether to go straight, turn to the right, curve to the right, make a right U-turn, turn to the left, curve to the left, or make a left U-turn.

Figure 4:
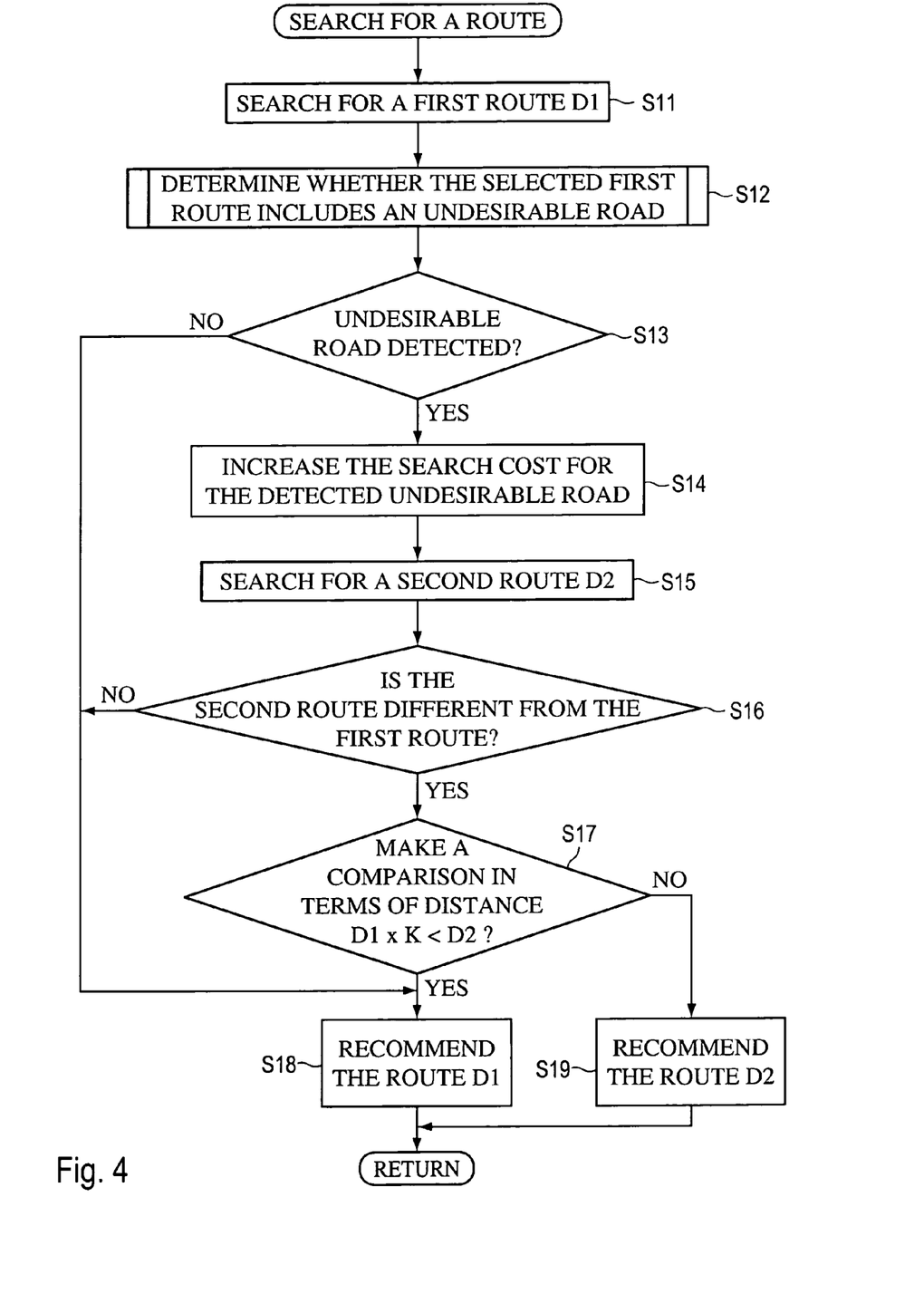
FIG. 4 is a diagram showing an example of a process performed by the navigation system to search for a route, according to an embodiment of the invention.
Figure 5:
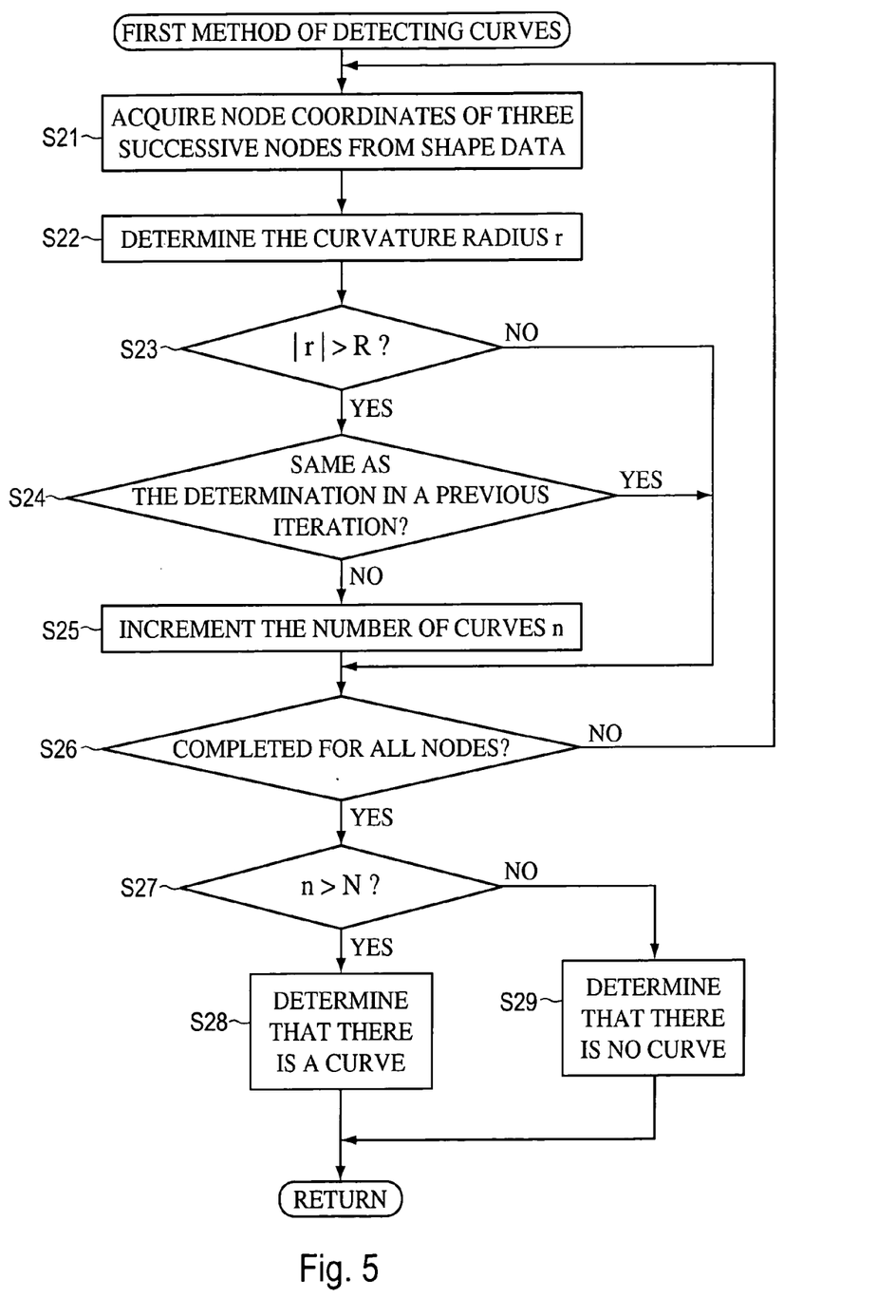
FIG. 5 is a diagram showing an example of a process of detecting a curve based on a sequence of coordinates.
Figure 6:
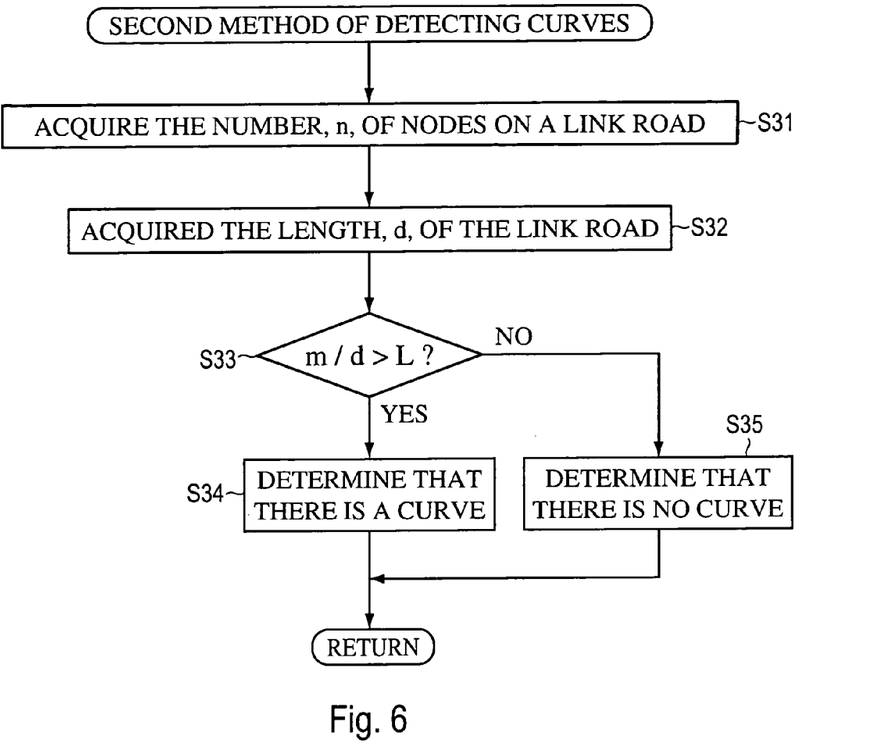
FIG. 6 is a diagram showing an example of a process of detecting a curve based on the number of coordinates.
Figure 7:
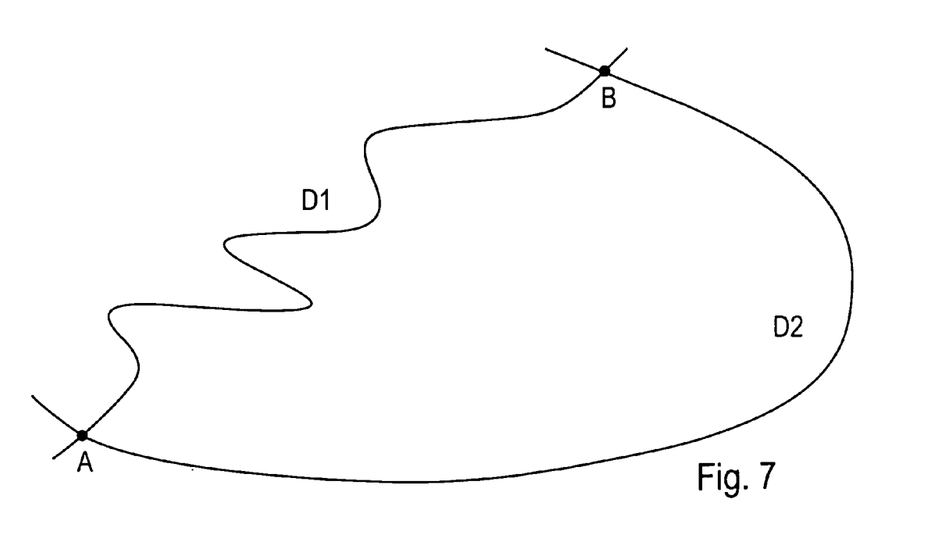
FIG. 7 is a diagram showing an example of a first route and an example of a route selected as a result of searching including a curve detection process.

In the navigation system according to the present embodiment, when navigation is performed in step S4, a route averting from roads that are unsuitable in practice for driving, such as a mountain road or a curved road, is searched. FIG. 4 is a diagram showing a specific example of a process performed by the navigation system to search for such a route according to the present embodiment. FIG. 5 is a diagram showing an example of a process of detecting a curve based on a sequence of coordinates. FIG. 6 is a diagram showing an example of a process of detecting a curve based on the number of coordinates. FIG. 7 is a diagram showing an example of a first route and an example of a route selected as a result of searching including a curve detection process.

In the route searching process performed by the navigation system according to the present embodiment, as shown in FIG. 4, a first route D1 is searched for using a conventional route searching method (step S11), a road unsuitable for driving is then extracted from the route D1 selected as a result of searching (step S12).

It is then determined whether such an unsuitable road has been detected (step S13). If it is determined that there is no unsuitable road (that is, if the answer to step S13 is no), the route D1 selected as a result of the searching is recommended (step S18). However, if it is determined that the route D1 includes an unsuitable road (that is, if the answer to step S13 is yes), the search cost for the unsuitable road is increased (step S14), and a second route D2 is searched for using the increased search cost (step S15).

Thereafter, it is determined whether the second route D2 selected as a result of the searching in step S15 is different from the first route D1 (step S16). If they are not different from each other (that is, if the answer is no), that is, if only a route that is the same as the first route D1 is found in the searching, the route D1 (D2) selected via the searching is recommended (step S18). However, if a different route is selected (that is, if the answer to step S16 is yes), the lengths of the routes D1 and D2 are compared to determine whether the length of the second route D2 is greater than the length of the first route D1 times K (step S17). If the length of the second route D2 is greater than the length of the first route D1 times K (that is, if the answer is yes), the route D1 selected via the searching is recommended (step S18). However, if it is determined that the length of the second route D2 is smaller than the length of the first route D1 times K, the second route D2 is recommended (step S19).

When an unsuitable road is detected depending on whether the road is curved, the detection is performed, as shown in FIG. 5, by first acquiring node coordinates of three successive points from shape data (step S21), determining the radius of curvature r (step S22), and determining whether the absolute value thereof, |r|, is greater than a radius of curvature R employed as a reference value (step S23).

If the radius of curvature r is greater than the reference value (that is, if the answer to step S23 is yes), it is further determined whether the determination result is the same as that for a previous set of three nodes (step S24). If no, it is determined that a new curve is detected, and the number of curves n is incremented (step S25). However, when it is determined that the radius of curvature r is not greater than the reference value (that is, if the answer to step S23 is no), or when the radius of curvature r is greater than the reference value, and if it is determined in step S24 that the determination result is the same as that for a previous set of three nodes (that is, if the answer to step S24 is yes), it is immediately determined whether the determination in terms of radius of curvature is completed for all nodes (step S26).

If it is determined that the determination in terms of radius of curvature is completed for all nodes (that is, if the answer to step S26 is yes), it is determined whether the number n of curves is greater than a threshold value (step S27). If the number n of curves is greater than the threshold value N (that is, if the answer to step S27 is yes), it is determined that a curved road is detected. That is, it is determined that a road unsuitable for driving on is detected (step S28). However, if the number n of curves is not greater than the threshold value N (that is, if the answer to step S27 is no), it is determined that no curves are detected (step S29).

Detection of a road unsuitable for driving can also be performed by detecting a curve based not on the radius of curvature but on the number of nodes. In this case, as shown in FIG. 6, first, the number m of nodes of a link road and the length d of the link road are acquired (steps S31 and S32). Thereafter, it is determined whether the number (m/d) of nodes per unit length is greater than a threshold value L (step S33). If the number (m/d) of nodes per unit length is greater than the threshold value L, it is determined that the road includes a curve. That is, it is determined that the road is unsuitable for driving (step S34). However, if the number (m/d) of nodes per unit length is not greater than the threshold value L (that is, if the answer to step S33 is no), it is determined that the road includes no curves (step S35). Note that the above process of determining whether a given road includes a curve is based on the premise that the presence of a curve results in an increase in the number of nodes per unit length.

In the process of searching for a route, as described above, if a first route D1 selected first via searching is determined to include a curve in the curve detection process, then the search cost for that road is increased and re-searching is performed. Even when a second route D2 selected as a result of the re-searching has a length greater than the length of the first route D1, if the length of the second route D2 is within a predetermined range, the second route D2 is recommended. However, if the length of the route D2 is too great compared with the length of the first route D1, the first route is recommended. Note that if the degree to which the search cost is increased is properly selected, the route determination based on a comparison in terms of the route length may be omitted.

In the invention, as is clearly described above, if a first route includes a road unsuitable for driving, a second route that is more suitable for driving is recommended instead of the first route that is smaller in length but includes the road unsuitable for driving.

It is to be noted that the invention is not limited to the specific embodiments described above, but various modifications are possible. For example, although in the embodiments described above, detection of curves is performed based on coordinates described in the form of point coordinates in road information or based on the number of coordinates, the road information may include curve information and detection of curves may be performed based on the curve information. Furthermore, although in the embodiments described above, a road including many curves is detected as a road unsuitable for driving on, a road having a great change in altitude may be detected as a road unsuitable for driving on. In this case, for the first route D1, the change in altitude of the road (the difference between the maximum altitude and the minimum altitude or the sum of changes in altitude each unit length) is calculated from node coordinates (x, y, z) including altitude information. If the change in altitude is greater than a predetermined value, the search cost is increased and a second route D2 is searched for using the increased search cost. The second route D2 selected as a result of the searching is recommended as a route suitable for driving. When a vehicle is driving on a certain road, if a curve is detected from map data or an output from a gyroscopic sensor, the location of the detected curve may be stored in storage means and the search cost for that location may be changed the next time route searching is performed.

When searching a route, the road data contained in the route search data is referred to in order to calculate the search cost for each road considered for the route. Here, the search cost means a weight given to each road to be subjected to the route search operation. For example, a weight may be given to a road in view of the following factors: a road type, a toll road or an expressway, length of the road, travel time, width of the road, and right turn or left turn. Accordingly, for example, if the search cost is calculated based on the length of the road, a route that minimizes the total length of the roads to the destination is determined as a distance-optimal route. Further, for example, if the search cost is calculated based on the travel time to the destination, a route that minimizes the total travel time to the destination is determined as a time-optimal route.

What is claimed is:

1. A navigation system that searches for a route to a destination based on stored map data that provides navigation guidance to the destination along the route, comprising:
a controller that:
    detects either a curve or a greater change in altitude than a predetermined value from a previously traveled road;
    stores a location of the detected curve or the detected change in altitude; and
    searches for a road that bypasses the location of the detected curve or the detected change in altitude when determining another route.

2. The navigation system according to claim 1, wherein when the controller detects the curve, the controller determines a radius of curvature based on node coordinates of the previously traveled road and detects the curve based on the radius of curvature.

3. The navigation system according to claim 1, wherein when the controller detects the curve, the controller detects the curve based on the number of nodes in the previously traveled road.

4. The navigation system according to claim 1, wherein when the controller detects the curve, the controller detects the curve based on a number of nodes per unit length.

5. The navigation system according to claim 1, wherein the controller detects the curve.

6. The navigation system according to claim 1, wherein the controller detects both the curve and the change in altitude.

7. The navigation system according to claim 1, wherein the controller selects the road that bypasses the location of the detected curve or the detected change in altitude when determining the another route.

8. A storage medium storing a set of program instructions executable on a data processing device and usable to search for a route to a destination based on stored map data and provide navigation guidance to the destination along the route, the program instructions comprising:
    a routine that detects either a curve or a greater change in altitude than the predetermined value from a previously traveled road;
    a routine that stores a location of the detected curve or the detected change in altitude; and
    a routine that searches for a road that bypasses the location of the detected curve or the detected change in altitude when determining another route.

9. The storage medium of claim 8, wherein the curve is detected based on a number of nodes per unit length.

10. The storage medium of claim 8, wherein the routine detects the curve.

11. The storage medium of claim 8, wherein the routine detects both the curve and the change in altitude.

12. The storage medium of claim 8, wherein the routine selects the road that bypasses the location of the detected curve or the detected change in altitude when determining the another route.

13. A storage medium storing a set of program instructions executable on a data processing device and usable to search for a route to a destination based on stored map data and provide navigation guidance to the destination along the route, wherein the storage medium stores:
    map data used in searching for the route and providing the navigation guidance along the route; and
    program instructions, comprising:
    a routine that detects either a curve or a greater change in altitude than a predetermined value from a previously traveled road;
    a routine that stores a location of the detected curve or the detected change in altitude; and
    a routine that searches for a road that bypasses the location of the detected curve or the detected change in altitude when determining another route.

14. The storage medium of claim 13, wherein the curve is detected based on a number of nodes per unit length.

15. The storage medium of claim 13, wherein the routine detects the curve.

16. The storage medium of claim 13, wherein the routine detects both the curve and the change in altitude.

17. The storage medium of claim 13, wherein the routine selects the road that bypasses the location of the detected curve or the detected change in altitude when determining the another route.

* * * * *